(12) United States Patent
Ehringer

(10) Patent No.: US 12,398,991 B2
(45) Date of Patent: Aug. 26, 2025

(54) DETACHABLE NUT AND BOLT IDENTIFICATION TOOL

(71) Applicant: Juan Ehringer, Gainesville, FL (US)

(72) Inventor: Juan Ehringer, Gainesville, FL (US)

( * ) Notice: Subject to any disclaimer, the term of this patent is extended or adjusted under 35 U.S.C. 154(b) by 369 days.

(21) Appl. No.: 18/201,344

(22) Filed: May 24, 2023

(65) Prior Publication Data

US 2024/0393096 A1    Nov. 28, 2024

(51) Int. Cl.
*G01B 5/02* (2006.01)

(52) U.S. Cl.
CPC ...................................... *G01B 5/02* (2013.01)

(58) Field of Classification Search
CPC ........................................................ G01B 5/02
USPC ............................................................ 33/403
See application file for complete search history.

(56) References Cited

U.S. PATENT DOCUMENTS

| | | | | |
|---|---|---|---|---|
| 2,722,150 A | * | 11/1955 | Green | |
| 4,028,970 A | * | 6/1977 | Pelczar | B25B 13/16 81/165 |
| 4,177,570 A | * | 12/1979 | Hewitt | G01B 5/02 33/174 R |
| 4,495,709 A | * | 1/1985 | Mainenti | G01B 3/04 33/484 |
| D278,691 S | * | 5/1985 | Sorrell | D10/64 |
| 4,730,399 A | * | 3/1988 | Campbell | G01B 5/00 33/143 |
| 4,745,685 A | * | 5/1988 | Castillo | G01B 5/16 33/199 R |
| 4,908,955 A | * | 3/1990 | Nicholson | G01B 3/24 33/808 |
| 5,131,162 A | * | 7/1992 | Miller | G01B 3/35 33/562 |
| D346,752 S | * | 5/1994 | Krusling et al. | D10/64 |
| 5,515,614 A | * | 5/1996 | Wing | G01B 3/34 33/548 |
| 2005/0120575 A1 | * | 6/2005 | Molmann | E01B 3/34 33/679.1 |
| 2007/0157484 A1 | * | 7/2007 | Grubler | E01B 3/00 33/679.1 |
| 2008/0229598 A1 | * | 9/2008 | Liu | G01B 3/00 33/562 |
| 2008/0276475 A1 | * | 11/2008 | Schafer | G01B 3/34 33/501.45 |
| 2010/0251556 A1 | * | 10/2010 | Burr | G01B 5/16 |
| 2012/0266471 A1 | * | 10/2012 | Chao | B43L 7/00 33/478 |
| 2015/0226534 A1 | * | 8/2015 | Rodriguez | G01B 3/38 |

(Continued)

FOREIGN PATENT DOCUMENTS

| | | | | |
|---|---|---|---|---|
| CN | 105674849 | * | 6/2016 | G01B 5/24 |
| CN | 113074607 | * | 7/2021 | G01B 5/02 |

*Primary Examiner* — John E Breene
(74) *Attorney, Agent, or Firm* — The Rapacke Law Group, P.A.; Andrew S. Rapacke

(57) ABSTRACT

A detachable or attachable nut and bolt identification tool including a main body and at least one detachable measuring tool is disclosed. The detachable measuring tool may be constructed and arranged to measure lengths, or nut or bolt measurements. The detachable measuring tool may be attachable to the main body via at least one fastener. According to some embodiments, multiple detachable measuring tools may be attached to the main body, including imperial and metric detachable measuring tools.

19 Claims, 4 Drawing Sheets

(56) References Cited

U.S. PATENT DOCUMENTS

2016/0349030 A1* 12/2016 Johnson .................. G01B 3/04
2017/0122717 A1* 5/2017 Baskovic ................. G01B 3/20

* cited by examiner

DETACHABLE NUT AND BOLT IDENTIFICATION TOOL

TECHNICAL FIELD

The embodiments generally relate to measuring tools.

BACKGROUND

Nut and bolt identification tools are limited to plastic bolt identifiers that hold the bolt to a plastic base; or loose nuts and bolts held by wire to a base.

SUMMARY OF THE INVENTION

This summary is provided to introduce a variety of concepts in a simplified form that is disclosed further in the detailed description of the embodiments. This summary is not intended to identify key or essential inventive concepts of the claimed subject matter, nor is it intended for determining the scope of the claimed subject matter.

The embodiments described herein relate to a detachable or attachable nut and bolt identification tool including a main body and at least one detachable measuring tool. The detachable measuring tool may be constructed and arranged to measure lengths, or nut or bolt measurements. The detachable measuring tool may be attachable to the main body.

According to some embodiments, multiple detachable measuring tools may be attached to the main body, including imperial and metric detachable measuring tools.

Both the foregoing general description and the following detailed description present embodiments intended to provide an overview or framework for understanding the nature and character of the embodiments disclosed herein. Any accompanying drawings are included to provide further understanding and are incorporated into and constitute a part of this specification. The drawings illustrate various embodiments of the disclosure, and together with the description explain the principles and operations thereof.

BRIEF DESCRIPTION OF THE DRAWINGS

A complete understanding of the present embodiments and the advantages and features thereof will be more readily understood by reference to the following detailed description when considered in conjunction with the accompanying drawings wherein.

Figure 1:
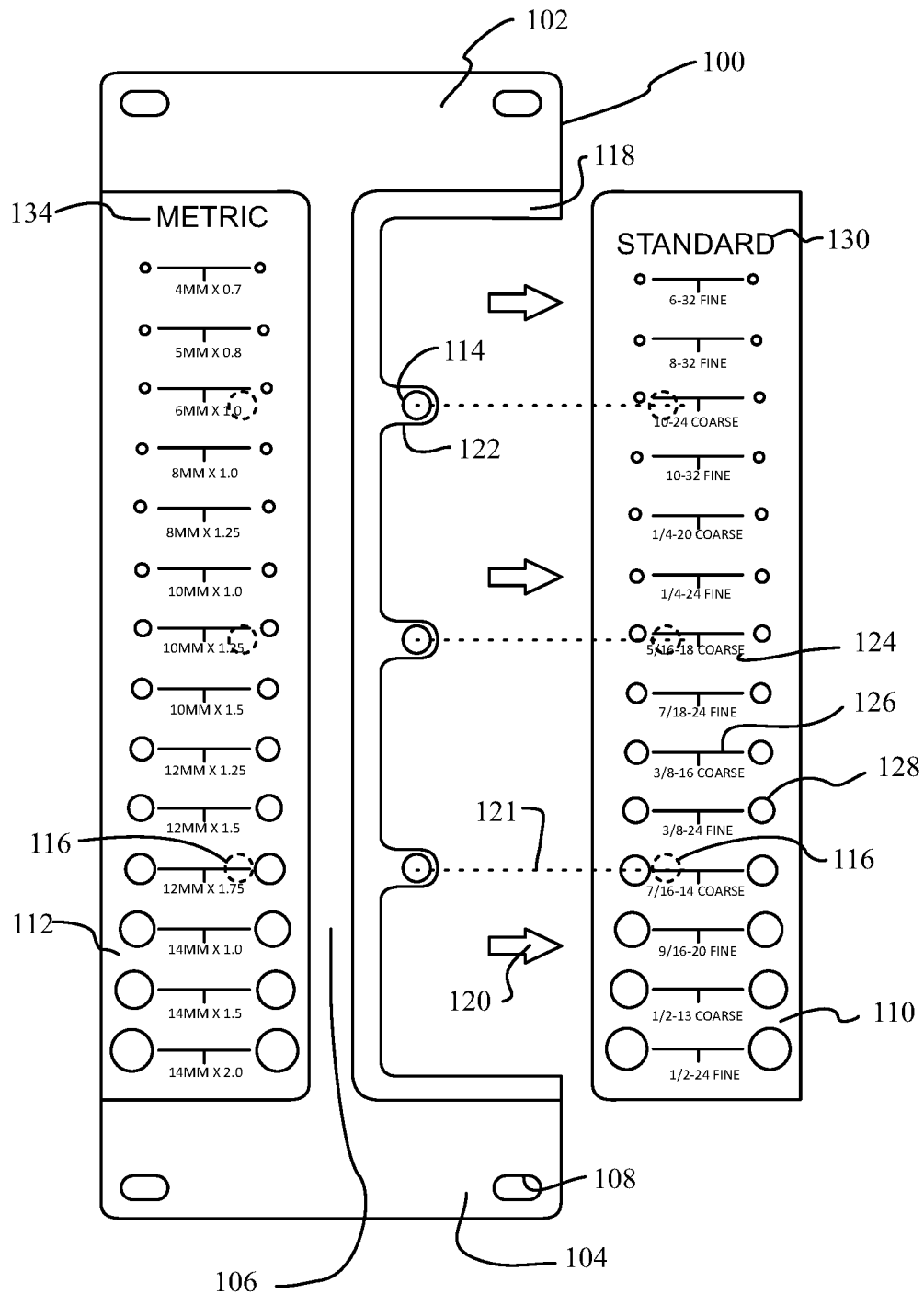
FIG. 1 illustrates a front view of a detachable nut and bolt identification tool, according to some embodiments.

The drawings are not necessarily to scale, and certain features and certain views of the drawings may be shown exaggerated in scale or in schematic in the interest of clarity and conciseness.

DETAILED DESCRIPTION

The specific details of the single embodiment or variety of embodiments described herein are to the described apparatus. Any specific details of the embodiments are used for demonstration purposes only, and no unnecessary limitations or inferences are to be understood therefrom.

Before describing in detail exemplary embodiments, it is noted that the embodiments reside primarily in combinations of components and procedures related to the apparatus. Accordingly, the apparatus components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

The specific details of the single embodiment or variety of embodiments described herein are set forth in this application. Any specific details of the embodiments are used for demonstration purposes only, and no unnecessary limitation or inferences are to be understood therefrom. Furthermore, as used herein, relational terms, such as "first" and "second," "top" and "bottom," and the like, may be used to distinguish one entity or element from another entity or element without necessarily requiring or implying any physical or logical relationship, or order between such entities or elements.

The embodiments described herein relate to a detachable nut and bolt identification tool including a main body having a first end opposite a second end, and a spine disposed between the first end and second connecting the two. The main body may define at least open pass-through hole in the first end, second end, or spine. The spine may include a plurality of tabs extending from the spine and having at least one magnet integrated or disposed within each tab. Alternatively, various other mechanical fasteners may be disposed within each tab. The main body may also define at least one shoulder approximately thinner than the main body and which may define at least one seat constructed and arranged to receive a measuring tool therein. The main body may be made of plastic, metal, wood, or other suitable material. The measuring tool may be made of plastic, metal, wood, or other suitable material.

At least one measuring tool may be constructed and arranged to at least partially seat on the at least one shoulder of the main body and within the seat. Each measuring tool may define a plurality of holes therein, each hole being a specific diameter for measuring the size of nuts or bolts by passing a nut through the hole or by aligning a nut and the hole to determine size of the nut or bolt. According to some embodiments, the plurality of holes may be a plurality of recesses which do not extend through the measuring tool. Diameters may include dimensions such as imperial or metric nut and bolt measurements. Labels may be printed or engraved adjacent to the holes indicating the hole measurement, such as 4 mm×0.7, 6-32 fine, or the like. Each measuring tool may include at least one, or a plurality of, fasteners, such as magnets, inlaid or attached thereto and generally positioned complimentary to the fasteners within the tabs of the main body such that when the measuring tool is seated on the shoulder, the magnets within the measuring tool facilitate magnetic attachment to the magnets within the tabs. Alternatively, various other mechanical fasteners may be disposed within each tab.

FIG. 1 illustrates a front view of a detachable nut and bolt identification tool 100 including a primary body 100 having a first end 102 and second end 104, and a spine 106 therebetween. Either the first end 102 or second end 104 may define through holes 108 therein. The spine 106 may include at least one tab 122 having a first set of fasteners 114 positioned therein. A plurality of tabs and fasteners may be arranged along the spine 106.

The primary body 100 may also include a tool shoulder 118 constructed and arranged to removably seat a measuring tool 110 therein. The measuring tool 110, 112 may include a second set of fasteners 116 constructed and arrange to attach to the first set of fasteners 114. The measuring tool 110 may be removed 120 from the primary body 100 for convenience and reattached 121 via the first and second sets of fasteners.

Each of the measuring tools 110, 112 may include printed or engraved measurement indicators 130, 134 thereon such as imperial and metric. Each of the measuring tools 110, 112 may include measuring perforations 128 therein for measuring the size of nuts or bolts by passing a nut through the measuring perforations 128 or by aligning a nut and the measuring perforations 128 to determine size of the nut or bolt. Nut and bolt size indicators 124, 126 may be printed or engraved in the surface of the measuring tools 110, 112.

Figure 2:
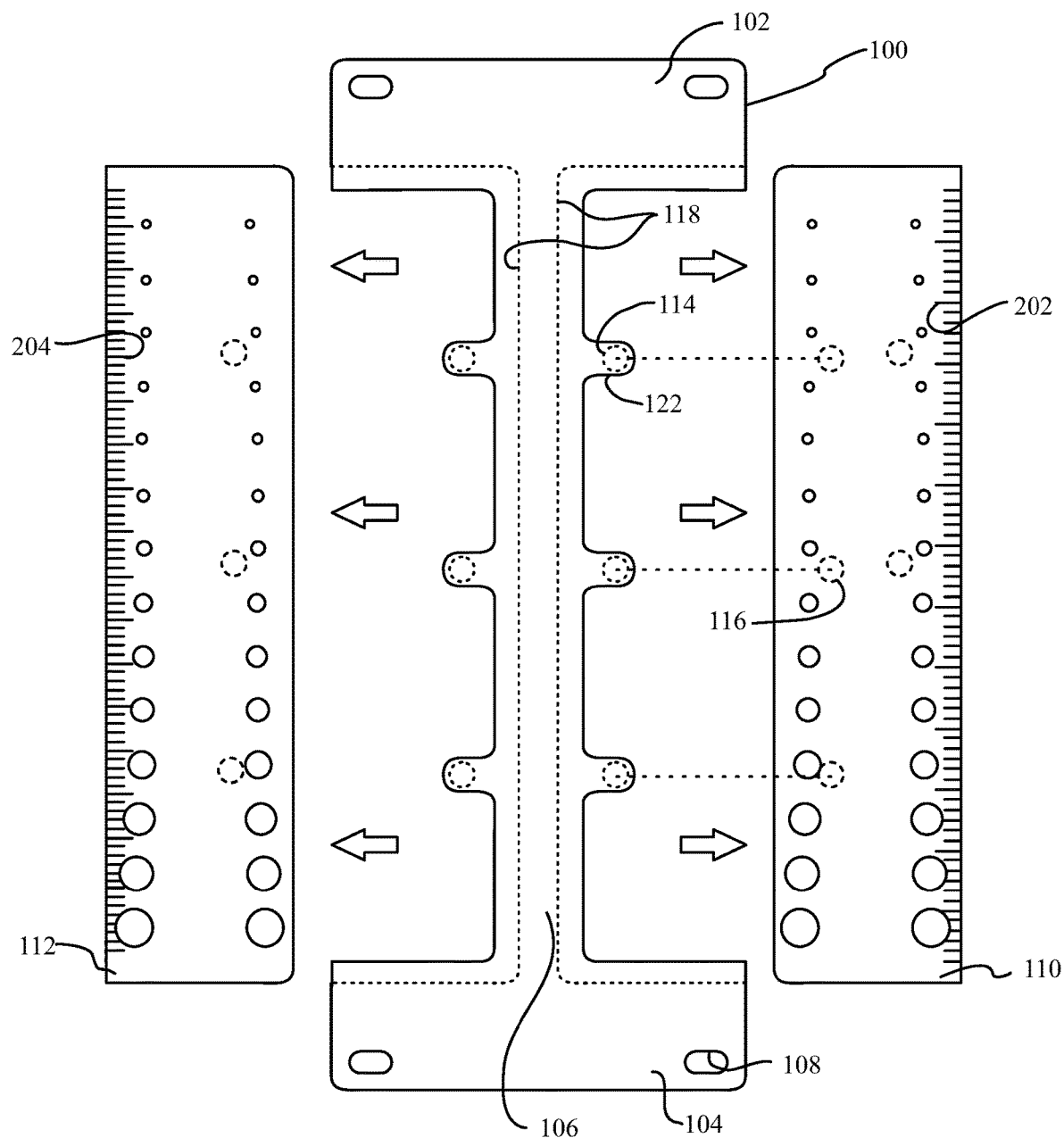
FIG. 2 illustrates a rear view of a detachable nut and bolt identification tool, according to some embodiments.
Figure 3:
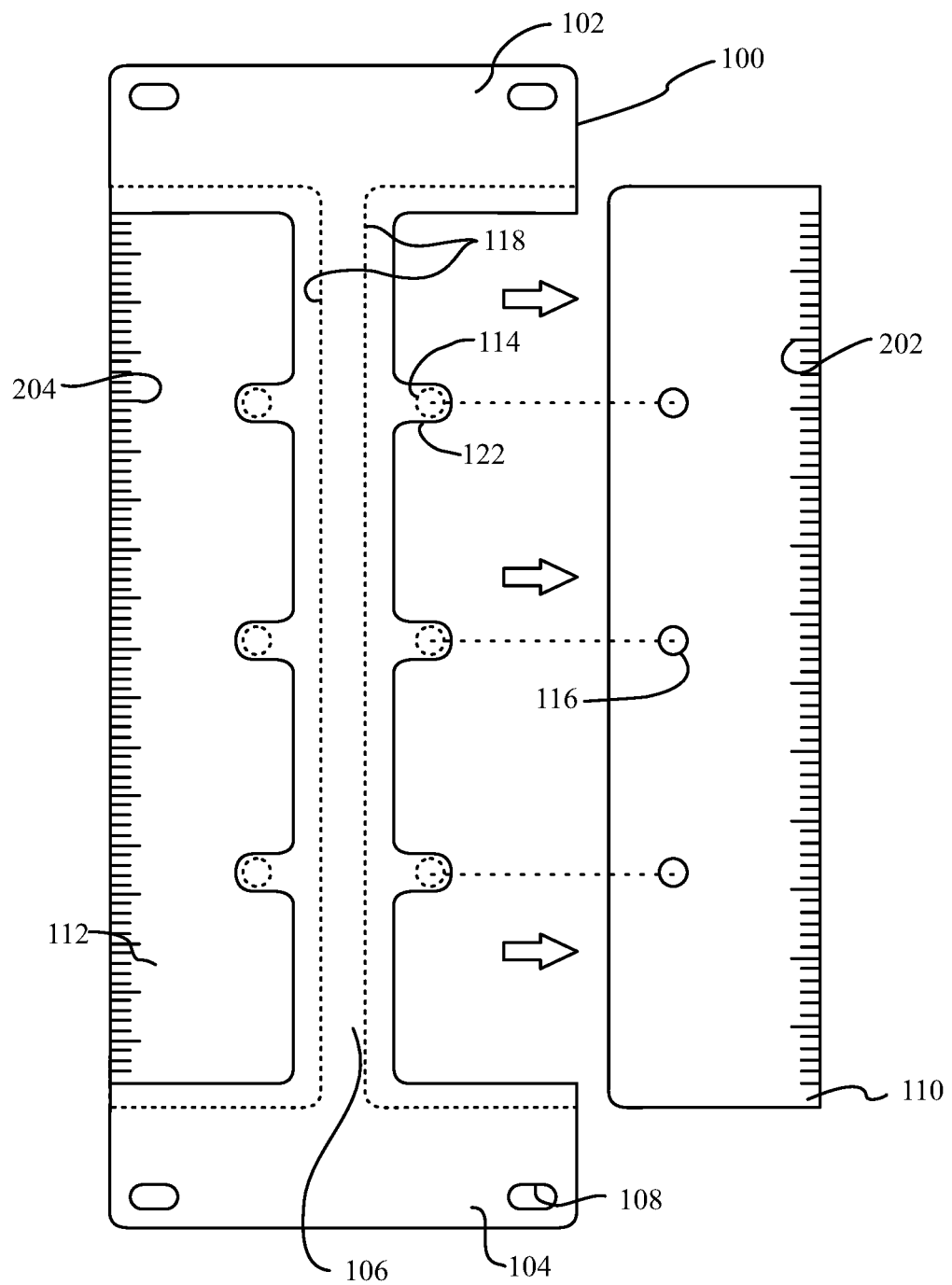
FIG. 3 illustrates a rear view of a detachable nut and bolt identification tool, according to some embodiments.

FIGS. 2 and 3 illustrate rear views of a detachable nut and bolt identification tool 100 including a primary body 100 having a first end 102 and second end 104, and a spine 106 therebetween. Either of the first end 102 or second end 104 may define through holes 108 therein. The spine 106 may include at least one tab 122 having a first set of fasteners 114 positioned therein. A plurality of tabs and fasteners may be arranged along the spine 106.

The primary body 100 may also include a tool shoulder 118 constructed and arranged to removably seat a measuring tool 110, 112 therein. The measuring tool 110, 112 may include a second set of fasteners 116 constructed and arrange to attach to the first set of fasteners 114. The measuring tool 110 may be removed 120 from the primary body 100 for convenience and reattached 121 via the first and second sets of fasteners.

Each of the measuring tools 110, 112 may include printed or engraved measurement indicators 202, 204 thereon such as imperial and metric rulers.

Figure 4:
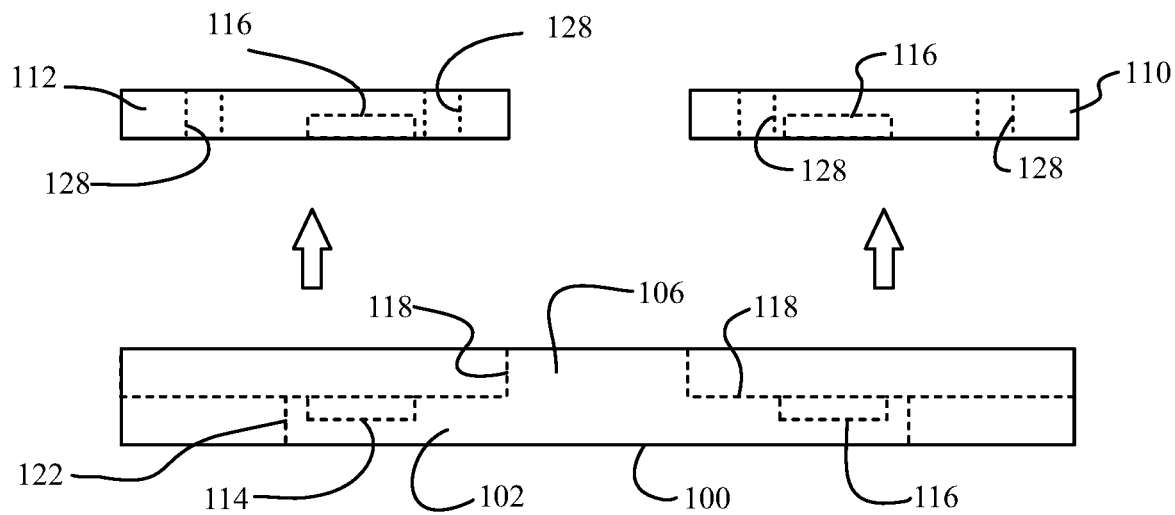
FIG. 4 illustrates a cross-sectional view of a detachable nut and bolt identification tool, according to some embodiments.

FIG. 4 illustrates a cross-sectional view of a detachable nut and bolt identification tool 100 including a primary body 100 having a first end 102 and second end (not shown) and a spine 106 therebetween. The spine 106 may include at least one tab 122 having a first set of fasteners 114 positioned therein.

The primary body 100 may also include a tool shoulder 118 constructed and arranged to removably seat a measuring tool 110 therein. The measuring tool 110, 112 may include a second set of fasteners 116 constructed and arrange to attach to the first set of fasteners 114.

Each of the measuring tools 110, 112 may include measuring perforations 128 therein for measuring the size of nuts or bolts by passing a nut through the measuring perforations 128 or by aligning a nut and the measuring perforations 128 to determine size of the nut or bolt.

The following description of variants is only illustrative of components, elements, acts, products, and methods considered to be within the scope of the invention and are not in any way intended to limit such scope by what is specifically disclosed or not expressly set forth. The components, elements, acts, products, and methods as described herein may be combined and rearranged other than as expressly described herein and are still considered to be within the scope of the invention.

According to variation 1, a detachable nut and bolt identification tool may include a primary body including first end, second end, and a spine therebetween, the primary body defining at least one tool shoulder; at least one tab disposed on the spine including at least one first fastener; and at least one measuring tool including at least one second fastener, the at least one measuring tool being removably attachable to the at least one tool shoulder via the at least one first fastener and the at least one second fastener.

Variation 2 may include a detachable nut and bolt identification tool as in variation 1 wherein the at least one tab is a plurality of tabs.

Variation 3 may include a detachable nut and bolt identification tool as in variation 1 or 2 wherein the at least one measuring tool is a plurality of measuring tools.

Variation 4 may include a detachable nut and bolt identification tool as in any of variations 1 through 3 wherein the at least one tool shoulder is a plurality of tool shoulders.

Variation 5 may include a detachable nut and bolt identification tool as in any of variations 1 through 4 wherein the at least one measuring tool defines at least one measuring perforation.

Variation 6 may include a detachable nut and bolt identification tool as in any of variations 1 through 5 wherein the at least one measuring tool includes measurement indicators.

Variation 7 may include a detachable nut and bolt identification tool as in any of variations 1 through 6 wherein the primary body includes plastic.

Variation 8 may include a detachable nut and bolt identification tool as in any of variations 1 through 7 wherein the at least one measuring tool includes aluminum.

According to variation 9, a detachable nut and bolt identification tool may include a primary body including first end, second end, and a spine therebetween, the primary body defining a first tool shoulder opposite a second tool shoulder; a first plurality of tabs disposed on the spine and including a first plurality of fasteners; a second plurality of tabs disposed on the spine and including a second plurality of fasteners; a first measuring tool including a third plurality of fasteners, the first measuring tool being removably attachable to the first tool shoulder; and a second measuring tool including a fourth plurality of fasteners, the second measuring tool being removably attachable to the second tool shoulder.

Variation 10 may include a detachable nut and bolt identification tool as in variation 9 wherein the first measuring tool defines a first plurality of measuring perforation.

Variation 11 may include a detachable nut and bolt identification tool as in variations 9 or 10 wherein the second measuring tool defines a second plurality of measuring perforation.

Variation 12 may include a detachable nut and bolt identification tool as in any of variations 9 through 11 wherein the first measuring tool includes a first set of measurement indicators.

Variation 13 may include a detachable nut and bolt identification tool as in any of variations 9 through 12 wherein the second measuring tool includes a second set of measurement indicators.

Variation 14 may include a detachable nut and bolt identification tool as in any of variations 9 through 13 wherein the primary body includes plastic.

Variation 15 may include a detachable nut and bolt identification tool as in any of variations 9 through 14 wherein the first measuring tool and the second measuring tool include aluminum.

According to variation 16, a detachable nut and bolt identification tool may include a plastic primary body including first end, second end, and a spine therebetween, the primary body defining a first tool shoulder opposite a second tool shoulder; a first plurality of tabs disposed on the spine and including a first plurality of fasteners; a second plurality of tabs disposed on the spine and including a second plurality of fasteners; a first aluminum measuring tool defining a first set of measurement perforations and including a second set of measurement indicators and a third plurality of fasteners, the first aluminum measuring tool being removably attachable to the first tool shoulder; and a second aluminum measuring tool defining a first set of measurement perforations and including a second set of measurement indicators and a fourth plurality of fasteners, the second aluminum measuring tool being removably attachable to the second tool shoulder.

Variation 17 may include a detachable nut and bolt identification tool as in variation 16 wherein the first set of measurement perforations and the first set of measurement indicators are metric.

Variation 18 may include a detachable nut and bolt identification tool as in variation 16 or 17 wherein the first set of measurement perforations and the second set of measurement indicators are imperial.

Variation 19 may include a detachable nut and bolt identification tool as in variation 16 or 18 wherein the first plurality of fasteners is a first plurality of magnets and the second plurality of fasteners is a second plurality of magnets.

Many different embodiments have been disclosed herein, in connection with the above description and the drawings. It will be understood that it would be unduly repetitious and obfuscating to describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

An equivalent substitution of two or more elements can be made for any one of the elements in the claims below or that a single element can be substituted for two or more elements in a claim. Although elements can be described above as acting in certain combinations and even initially claimed as such, it is to be expressly understood that one or more elements from a claimed combination can in some cases be excised from the combination and that the claimed combination can be directed to a subcombination or variation of a subcombination.

It will be appreciated by persons skilled in the art that the present embodiment is not limited to what has been particularly shown and described hereinabove. A variety of modifications and variations are possible in light of the above teachings without departing from the following claims.

What is claimed is:

1. A detachable nut and bolt identification tool comprising:
   a primary body comprising first end, second end, and a spine therebetween, the primary body defining at least one tool shoulder;
   at least one tab disposed on the spine comprising at least one first fastener; and
   at least one measuring tool comprising at least one second fastener, the at least one measuring tool being removably attachable to the at least one tool shoulder via the at least one first fastener and the at least one second fastener.

2. A detachable nut and bolt identification tool as in claim 1 wherein the at least one tab is a plurality of tabs.

3. A detachable nut and bolt identification tool as in claim 1 wherein the at least one measuring tool is a plurality of measuring tools.

4. A detachable nut and bolt identification tool as in claim 1 wherein the at least one tool shoulder is a plurality of tool shoulders.

5. A detachable nut and bolt identification tool as in claim 1 wherein the at least one measuring tool defines at least one measuring perforation.

6. A detachable nut and bolt identification tool as in claim 1 wherein the at least one measuring tool comprises measurement indicators.

7. A detachable nut and bolt identification tool as in claim 1 wherein the primary body comprises plastic.

8. A detachable nut and bolt identification tool as in claim 1 wherein the at least one measuring tool comprises aluminum.

9. A detachable nut and bolt identification tool comprising:
   a primary body comprising first end, second end, and a spine therebetween, the primary body defining a first tool shoulder opposite a second tool shoulder;
   a first plurality of tabs disposed on the spine and comprising a first plurality of fasteners;
   a second plurality of tabs disposed on the spine and comprising a second plurality of fasteners;
   a first measuring tool comprising a third plurality of fasteners, the first measuring tool being removably attachable to the first tool shoulder; and
   a second measuring tool comprising a fourth plurality of fasteners, the second measuring tool being removably attachable to the second tool shoulder.

10. A detachable nut and bolt identification tool as in claim 9 wherein the first measuring tool defines a first plurality of measuring perforation.

11. A detachable nut and bolt identification tool as in claim 9 wherein the second measuring tool defines a second plurality of measuring perforation.

12. A detachable nut and bolt identification tool as in claim 9 wherein the first measuring tool comprises a first set of measurement indicators.

13. A detachable nut and bolt identification tool as in claim 9 wherein the second measuring tool comprises a second set of measurement indicators.

14. A detachable nut and bolt identification tool as in claim 9 wherein the primary body comprises plastic.

15. A detachable nut and bolt identification tool as in claim 9 wherein the first measuring tool and the second measuring tool comprise aluminum.

16. A detachable nut and bolt identification tool comprising:
   a plastic primary body comprising first end, second end, and a spine having a first side and a second side therebetween, the primary body defining a first tool shoulder opposite a second tool shoulder;
   a first set of three tabs disposed on the first side of the spine and comprising a first plurality of fasteners;
   a second set of three tabs disposed on the second side of the spine and comprising a second plurality of fasteners;
   a first aluminum measuring tool defining a first set of measurement perforations and comprising a second set of measurement indicators and a third plurality of fasteners, the first aluminum measuring tool being removably attachable to the first set of three tabs and the first tool shoulder; and a second aluminum measuring tool defining a first set of measurement perforations and comprising a second set of measurement indicators and a fourth plurality of fasteners, the second aluminum measuring tool being removably attachable to the second set of three tabs and the second tool shoulder.

17. A detachable nut and bolt identification tool as in claim 16 wherein the first set of measurement perforations and the first set of measurement indicators are metric.

18. A detachable nut and bolt identification tool as in claim 16 wherein the first set of measurement perforations and the second set of measurement indicators are imperial.

19. A detachable nut and bolt identification tool as in claim 16 wherein the first plurality of fasteners is a first plurality of magnets and the second plurality of fasteners is a second plurality of magnets.

* * * * *